(12) United States Patent
Minnette et al.

(10) Patent No.: US 12,041,987 B2
(45) Date of Patent: Jul. 23, 2024

(54) FACE MASK WITH REPLACEABLE FILTER CARTRIDGES AND COMPONENTS

(71) Applicant: Nypro Inc., Clinton, MA (US)

(72) Inventors: Jeffrey C. Minnette, Clinton, MA (US); Ryan P. Davidson, Clinton, MA (US)

(73) Assignee: Nypro Inc., Clinton, MA (US)

( * ) Notice: Subject to any disclaimer, the term of this patent is extended or adjusted under 35 U.S.C. 154(b) by 0 days.

(21) Appl. No.: 17/950,200

(22) Filed: Sep. 22, 2022

(65) Prior Publication Data

US 2023/0014391 A1 Jan. 19, 2023

Related U.S. Application Data

(63) Continuation of application No. 17/362,757, filed on Jun. 29, 2021, now Pat. No. 11,478,027.

(60) Provisional application No. 63/046,892, filed on Jul. 1, 2020.

(51) Int. Cl.
| | |
|---|---|
| *A41D 13/11* | (2006.01) |
| *A62B 18/02* | (2006.01) |
| *A62B 19/00* | (2006.01) |
| *A62B 23/00* | (2006.01) |
| *A62B 23/02* | (2006.01) |
| *B01D 27/06* | (2006.01) |

(52) U.S. Cl.
CPC .......... *A41D 13/1115* (2013.01); *A41D 13/11* (2013.01); *A41D 13/1161* (2013.01); *A62B 18/025* (2013.01); *A62B 19/00* (2013.01); *A62B 23/00* (2013.01); *A62B 23/02* (2013.01); *B01D 27/06* (2013.01); *A41D 2300/24* (2013.01); *A41D 2500/50* (2013.01)

(58) Field of Classification Search
CPC . A41D 13/11–1192; A62B 7/10; A62B 23/02; A62B 23/025; A62B 19/00; A62B 19/02; A62B 18/02; A62B 18/025; B01D 46/2411; B01D 46/2414
See application file for complete search history.

(56) References Cited

U.S. PATENT DOCUMENTS

| | | |
|---|---|---|
| 2,845,927 A | 8/1958 | Hill |
| 3,161,491 A | 12/1964 | Gongoll |
| 5,222,488 A | 6/1993 | Forsgren |
| 5,579,761 A | 12/1996 | Yuschak et al. |

(Continued)

FOREIGN PATENT DOCUMENTS

| | | |
|---|---|---|
| KR | 20-2017-0000048 U | 1/2017 |
| KR | 10-2019-0089188 A | 7/2019 |
| KR | 10-2020-0009664 A | 1/2020 |

OTHER PUBLICATIONS

Peng, Austin; "Guide To In-Mold Labeling (IML): Everything You Need To Know"; Oct. 4, 2020; Senzhen DEK Manufacturing Co., Ltd. (Year: 2020).*

*Primary Examiner* — Valerie L Woodward
(74) *Attorney, Agent, or Firm* — Young Basile Hanlon & MacFarlane, P.C.

(57) ABSTRACT

Disclosed herein are methods and systems for face mask with replaceable filter cartridges and components. A face mask includes a mask component, a replaceable filter component, and a closure component. The replaceable filter component is bonded to and as between the closure component and the mask component when the closure component is attached to the mask component.

15 Claims, 18 Drawing Sheets

(56) References Cited

U.S. PATENT DOCUMENTS

| | | | |
|---|---|---|---|
| 6,435,184 B1 | 8/2002 | Ho | |
| 8,342,179 B2 | 1/2013 | Hacke et al. | |
| 2005/0160911 A1 | 7/2005 | Friday et al. | |
| 2005/0173325 A1* | 8/2005 | Klein | B01D 37/025 |
| | | | 210/206 |
| 2007/0056588 A1* | 3/2007 | Hayek | A61M 16/06 |
| | | | 128/205.25 |
| 2009/0250060 A1 | 10/2009 | Hacke et al. | |
| 2010/0179465 A1* | 7/2010 | Nakao | A61M 1/3633 |
| | | | 156/325 |
| 2011/0247626 A1 | 10/2011 | Chuang | |
| 2011/0297152 A1 | 12/2011 | Duveen et al. | |
| 2013/0152948 A1 | 6/2013 | Inagaki et al. | |
| 2014/0230388 A1* | 8/2014 | Hio | B01D 29/07 |
| | | | 210/493.1 |
| 2017/0065838 A1 | 3/2017 | Bunge et al. | |
| 2018/0021716 A1 | 1/2018 | Li et al. | |
| 2018/0361295 A1* | 12/2018 | Legare | B01D 46/0005 |
| 2019/0275357 A1 | 9/2019 | Palmer, Jr. et al. | |
| 2019/0299035 A1 | 10/2019 | Sebastian et al. | |
| 2021/0275842 A1* | 9/2021 | Conrad | A62B 23/025 |

* cited by examiner

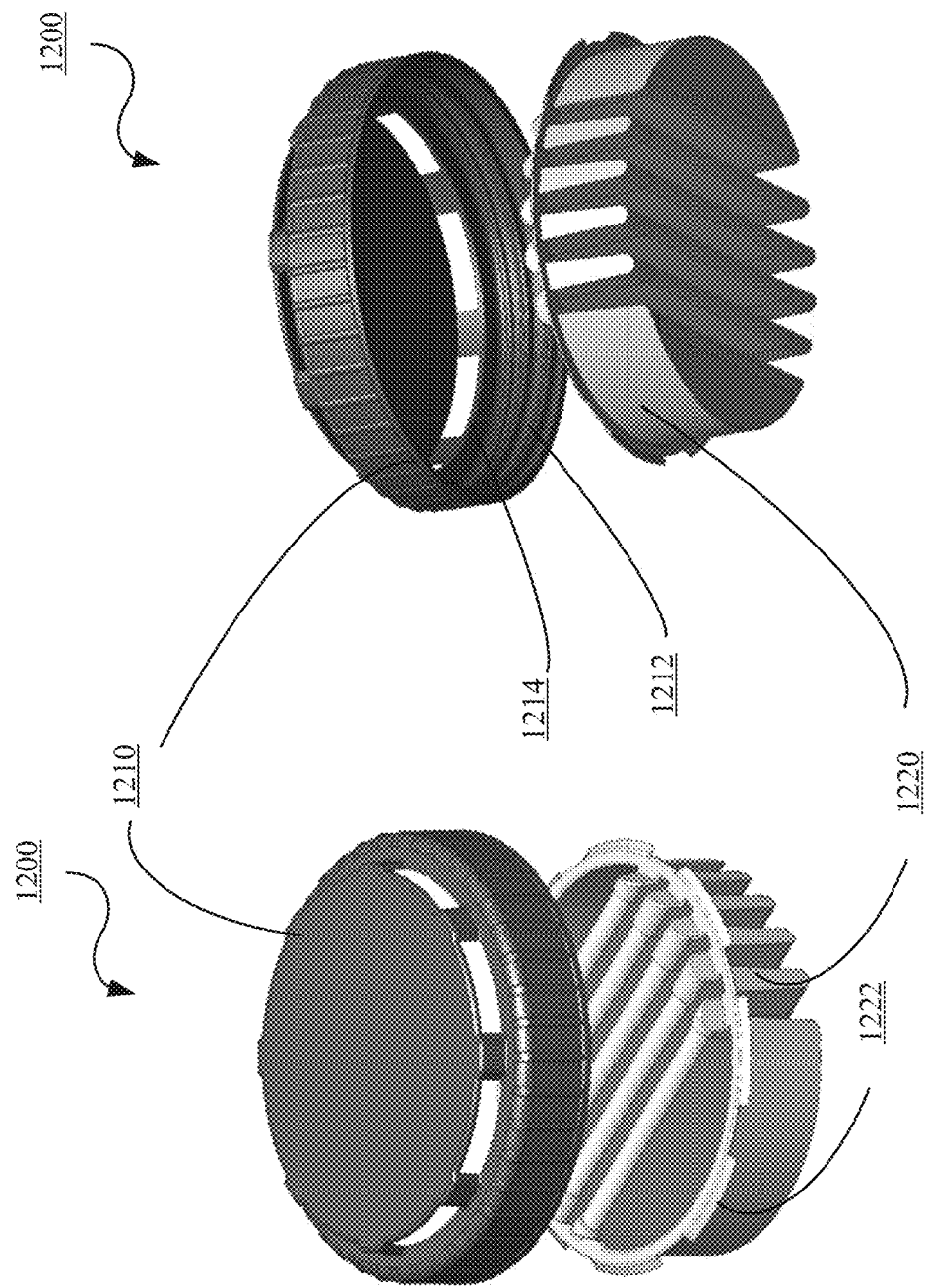

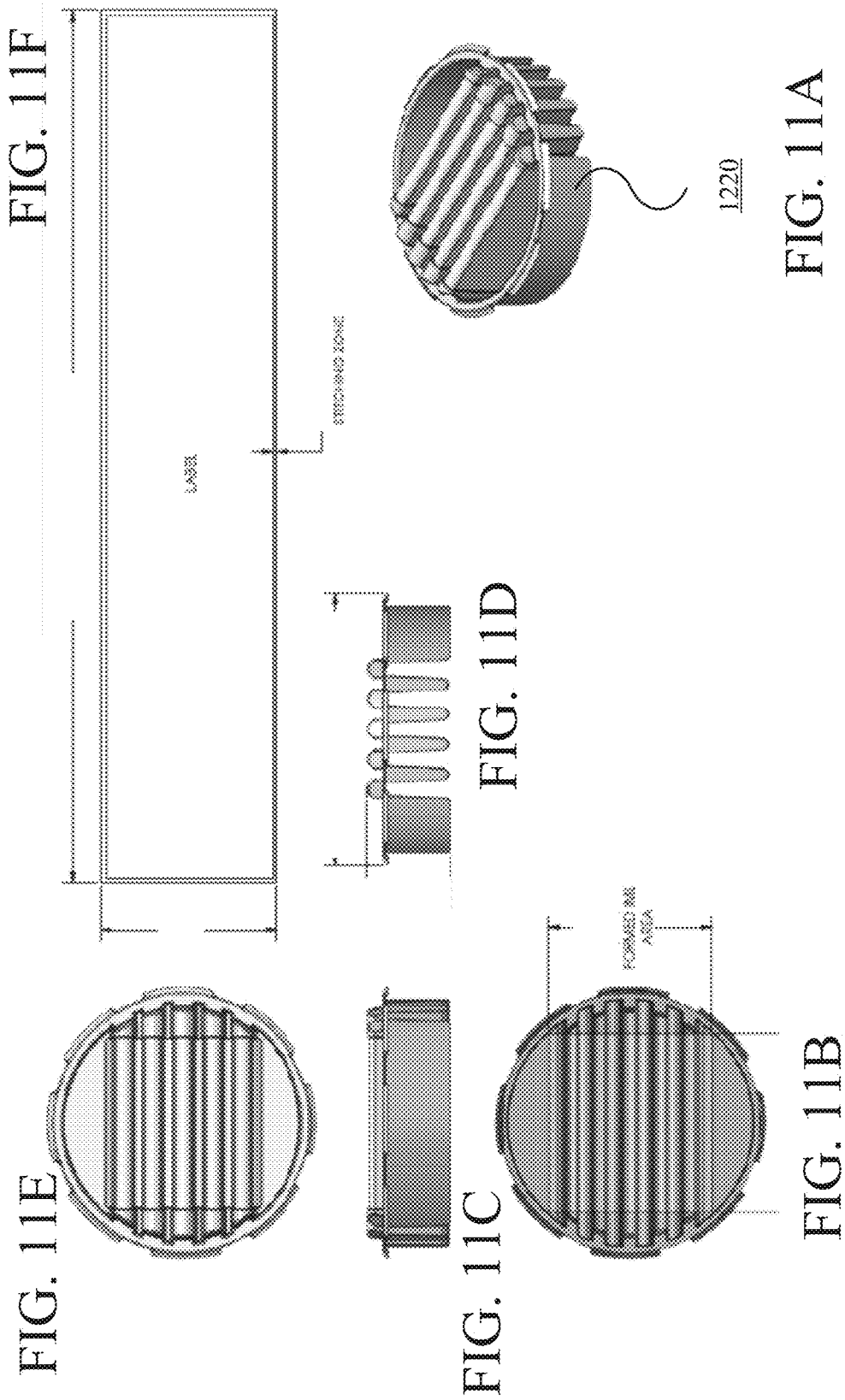

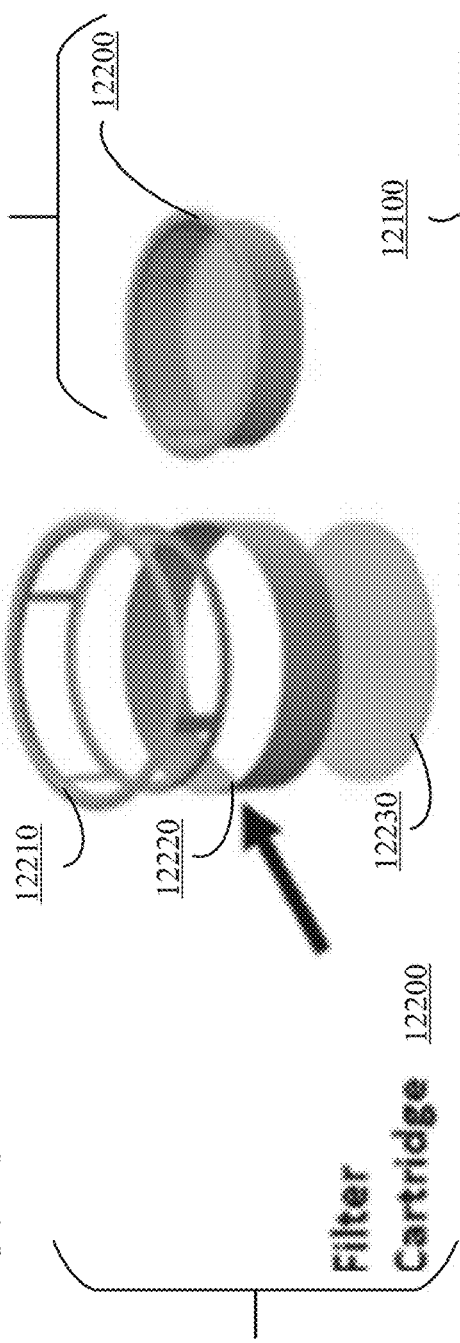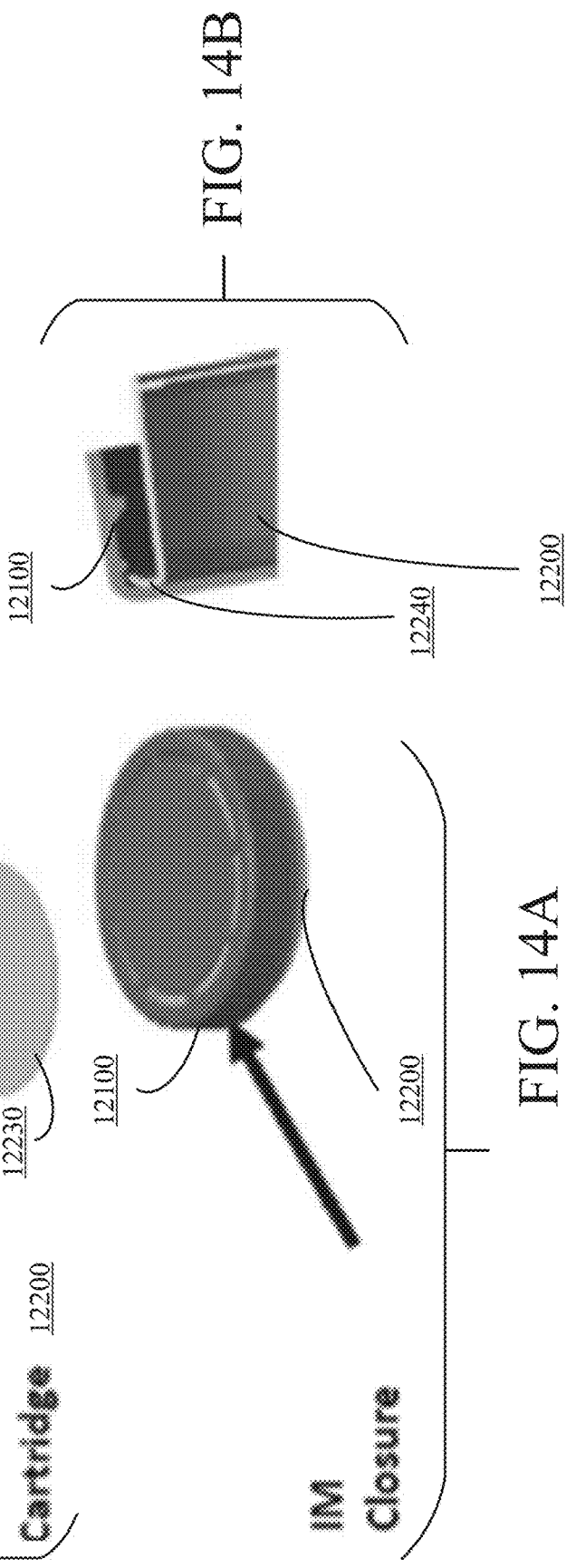

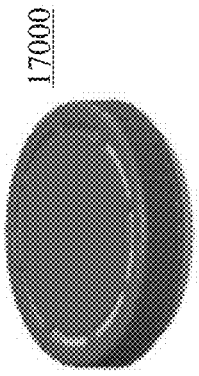
FIG. 15A
Closure: 83mm SBT
Standard Threaded
FIG. 15B
Injection molded frame:
neck base+vertical ribs
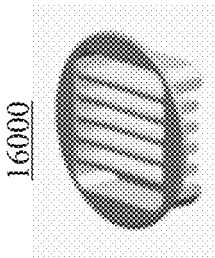
FIG. 15C
Filter Material: iML
Bonded to frame
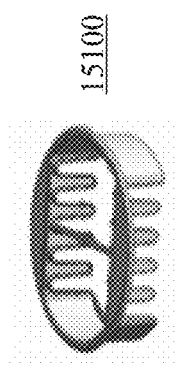
FIG. 16
iML Filter Cartridge
AIR FLOW SURFACE AREA: 10,216 mm²
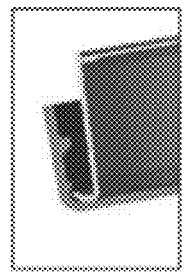
FIG. 17
Closure/Filter Cartridge
"Snap-fit" Assembly
FIG. 18

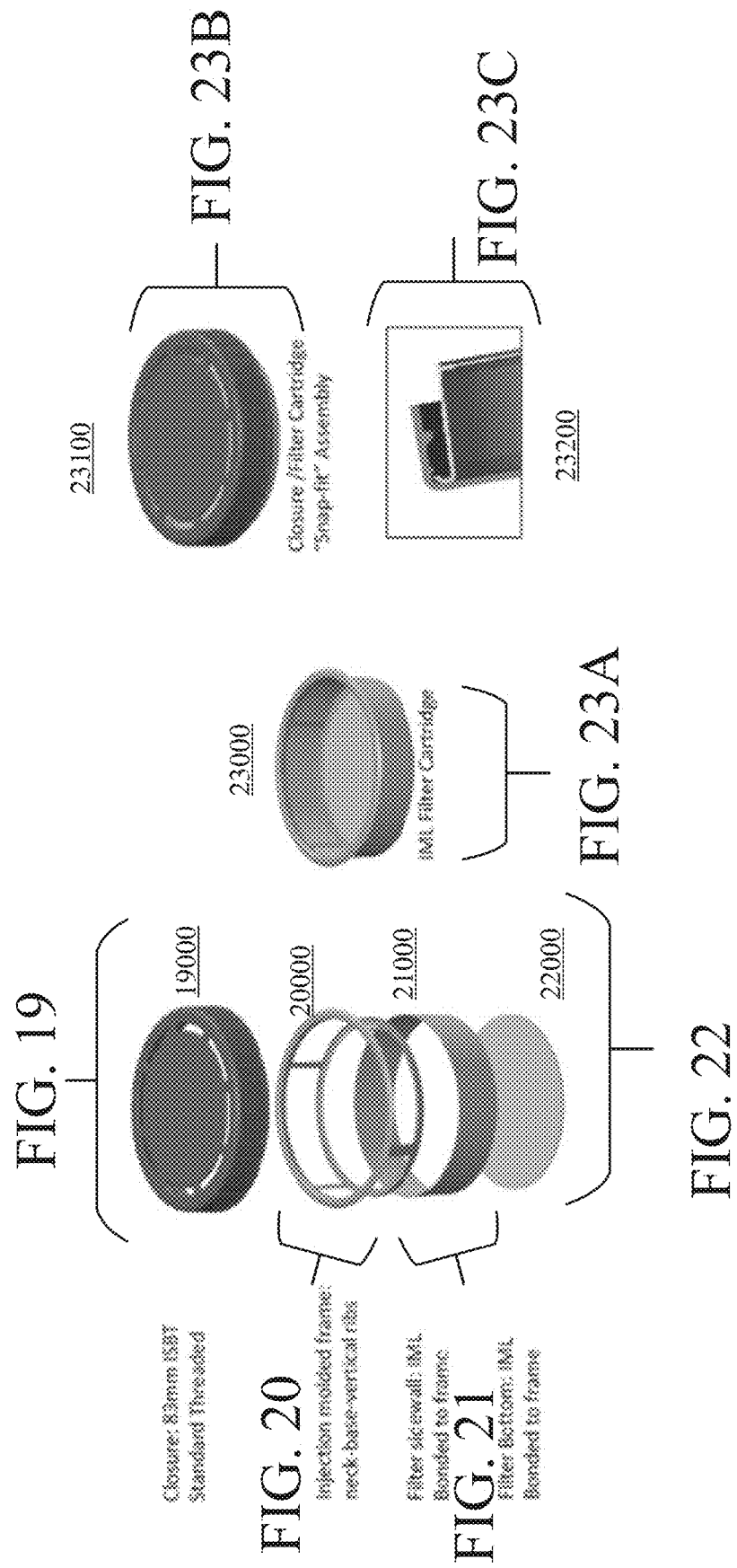

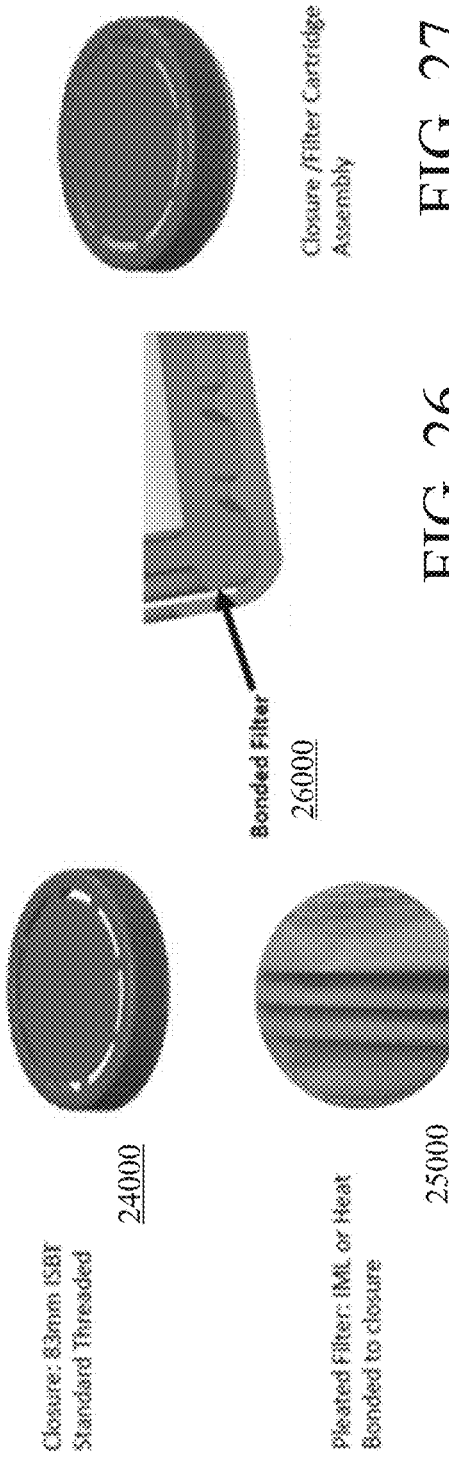

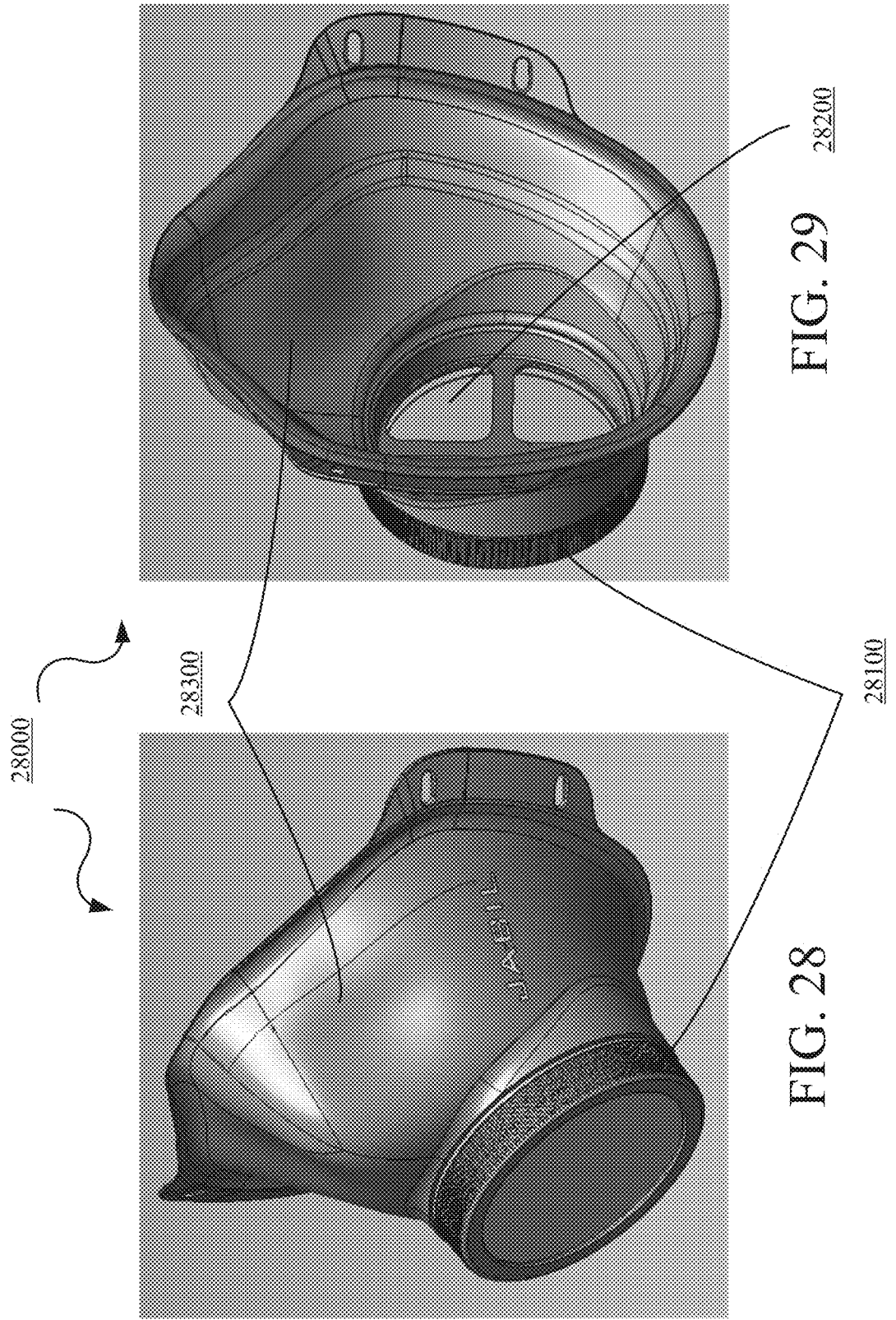

FACE MASK WITH REPLACEABLE FILTER CARTRIDGES AND COMPONENTS

CROSS REFERENCE TO RELATED APPLICATION

This application is a continuation of U.S. patent application Ser. No. 17/362,757, filed on Jun. 29, 2021, which claims priority to U.S. Provisional Application No. 63/046,892, filed on Jul. 1, 2020, the contents of which are incorporated by reference herein.

TECHNICAL FIELD

This disclosure relates to personal protection equipment and in particular, a face mask with a replaceable filter cartridge and component.

SUMMARY

Disclosed herein are methods and systems for a face mask with replaceable filter cartridges and components.

In an implementation, a face mask includes a mask component and a replaceable filter cartridge. The replaceable filter cartridge includes a closure configured to replaceably fit the mask component, a filter frame configured to fit into the closure, and a multi-folded filter material configured to bond to the filter frame.

In an implementation, a face mask includes a mask component and a replaceable closure assembly. The replaceable closure assembly includes a closure configured to replaceably fit with the mask component and a filter material configured to bond to the closure when the replaceable closure assembly is attached to the mask component.

BRIEF DESCRIPTION OF THE DRAWINGS

The disclosure is best understood from the following detailed description when read in conjunction with the accompanying drawings and are incorporated into and thus constitute a part of this specification. It is emphasized that, according to common practice, the various features of the drawings are not to-scale. On the contrary, the dimensions of the various features are arbitrarily expanded or reduced for clarity.

FIG. 7 is an exploded view of a replaceable filter cartridge in accordance with implementations.

FIG. 8 is a reverse exploded view of the replaceable filter cartridge of FIG. 7 in accordance with implementations.

FIGS. 11A-F are different views of a filter component in accordance with implementations.

FIG. 13A is a perspective view of a filter cartridge component in accordance with implementations.

FIG. 13B is a perspective view of a filter cartridge component in accordance with implementations.

FIG. 14A is a view of a closure component in accordance with implementations.

FIG. 14B is a view of a juncture between the closure component and the filter cartridge component in accordance with implementations.

FIGS. 15A-C are views of three components of a filter cartridge component in accordance with implementations.

FIG. 16 is a view of a filter cartridge in accordance with implementations.

FIG. 17 is a view of an assembled filter cartridge component in accordance with implementations.

FIG. 18 is an exploded view of a filter cartridge/frame and closure component juncture in accordance with implementations.

FIG. 19 is a view of a closure component in accordance with implementations.

FIG. 20 is a view of a filter frame component in accordance with implementations.

FIG. 21 is a view of a filter material sidewall in accordance with implementations.

FIG. 22 is a view of a filter material base in accordance with implementations.

FIG. 23A is a view of a filter cartridge component in accordance with implementations.

FIG. 23B is a view of an assembled filter cartridge component and closure component in accordance with implementations.

FIG. 23C is an exploded view of a frame and closure juncture in accordance with implementations.

FIG. 24 is a view of a closure component in accordance with implementations.

FIG. 25 is a view of a pleated filter material in accordance with implementations.

FIG. 26 is a view of an assembled filter in accordance with implementations.

FIG. 27 is an exploded view of a pleated filter material bonded to a closure component in accordance with implementations.

FIG. 28 is a view of a face mask with a replaceable filter component in accordance with implementations.

FIG. 29 is a reverse view of the face mask of FIG. 28 in accordance with implementations.

DETAILED DESCRIPTION

Figure 2:
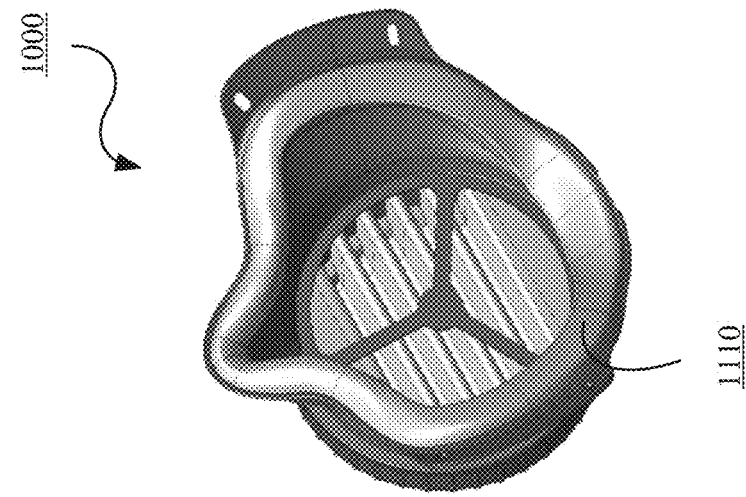
FIG. 2 is a reverse view of the face mask with a replaceable filter cartridge of FIG. 1 in accordance with implementations.

The figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Embodiments are provided throughout so that this disclosure is sufficiently thorough and fully conveys the scope of the disclosed embodiments to those who are skilled in the art. Numerous specific details are set forth, such as examples of specific aspects, devices, and methods, to provide a thorough understanding of embodiments of the present disclosure. Nevertheless, it will be apparent to those skilled in the art that certain specific disclosed details need not be employed, and that embodiments may be embodied in different forms. As such, the exemplary embodiments set forth should not be construed to limit the scope of the disclosure.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, steps, operations, elements, components, and/or groups thereof.

The steps, processes, and operations described herein are thus not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

Yet further, although the terms first, second, third, etc. may be used herein to describe various elements, steps or aspects, these elements, steps or aspects should not be limited by these terms. These terms may be only used to distinguish one element or aspect from another. Thus, terms such as "first," "second," and other numerical terms when used herein do not imply a sequence or order unless clearly indicated by the context. Thus, a first element, step, component, region, layer or section discussed below could be termed a second element, step, component, region, layer or section without departing from the teachings of the disclosure.

The non-limiting embodiments described herein are with respect to face masks with replaceable filter cartridges and components. The face masks with replaceable filter cartridges and components may be modified for a variety of applications and uses while remaining within the spirit and scope of the claims. The embodiments and variations described herein, and/or shown in the drawings, are presented by way of example only and are not limiting as to the scope and spirit. The descriptions herein may be applicable to all embodiments of the device and the methods for making the devices.

Disclosed herein are implementations of face masks with replaceable filter cartridges and components.

Figure 1:
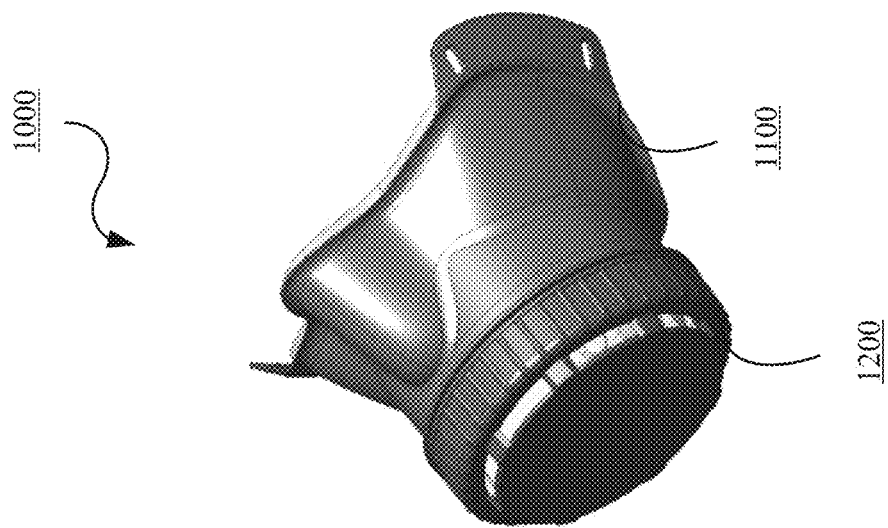
FIG. 1 is a view of a face mask with a replaceable filter cartridge in accordance with implementations.

FIG. 1 is a view of a face mask 1000 with a replaceable filter cartridge in accordance with implementations. FIG. 2 is a reverse view of the face mask 1000 of FIG. 1 in accordance with implementations. The face mask 1000 has a face mask component 1100 and a replaceable and/or removeable filter cartridge component 1200. In implementations, the replaceable and/or removeable filter cartridge component 1200 is screwed or interference fitted onto the face mask component 1100. Consequently, the replaceable and/or removeable filter cartridge component 1200 can be removed and replaced after each use. The face mask component 1100 includes a gasket-type sealing component 1110 for conforming to a user's face and providing a seal against environmental contamination.

Figure 3:
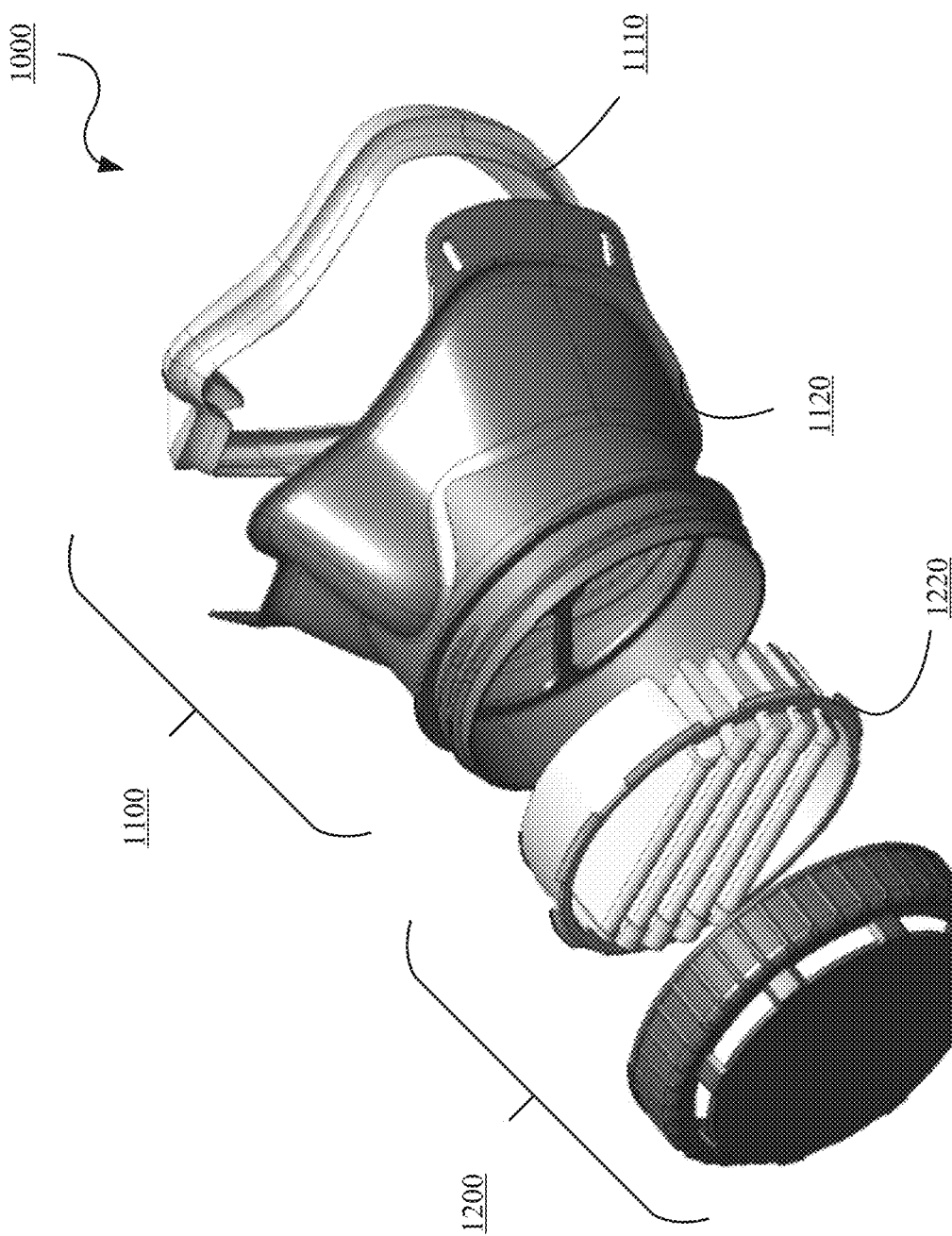
FIG. 3 is an exploded view of the face mask with a replaceable filter cartridge of FIG. 1 in accordance with implementations.
Figure 4:
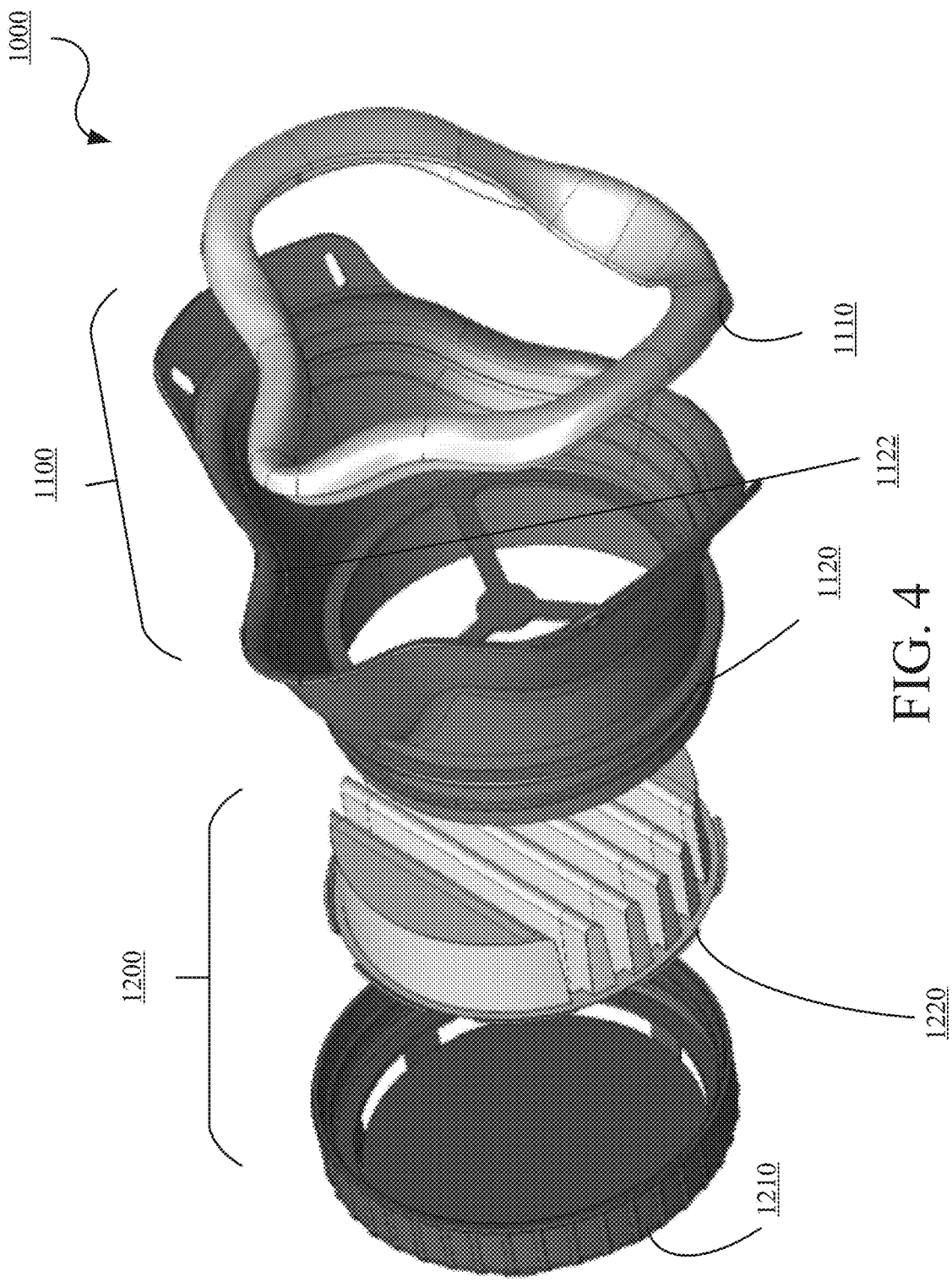
FIG. 4 is an exploded reverse view of the face mask with a replaceable filter cartridge of FIG. 1 in accordance with implementations.

FIG. 3 is an exploded view of the face mask 1000 of FIG. 1 in accordance with implementations and FIG. 4 is an exploded reverse view of the face mask 1000 of FIG. 1 in accordance with implementations. The face mask component 1100 includes a mask component 1120 which is bonded with or adhered to the gasket-type sealing component 1110. The gasket-type sealing component 1110 can be form-fitted, press-fitted, glued, and the like to bond to a conforming surface 1122 of the mask component 1120. The replaceable and/or removeable filter cartridge component 1200 includes a closure component 1210 and a filter component 1220. The closure component 1210 is configured to receive the filter component 1220.

Figures 5, 6:
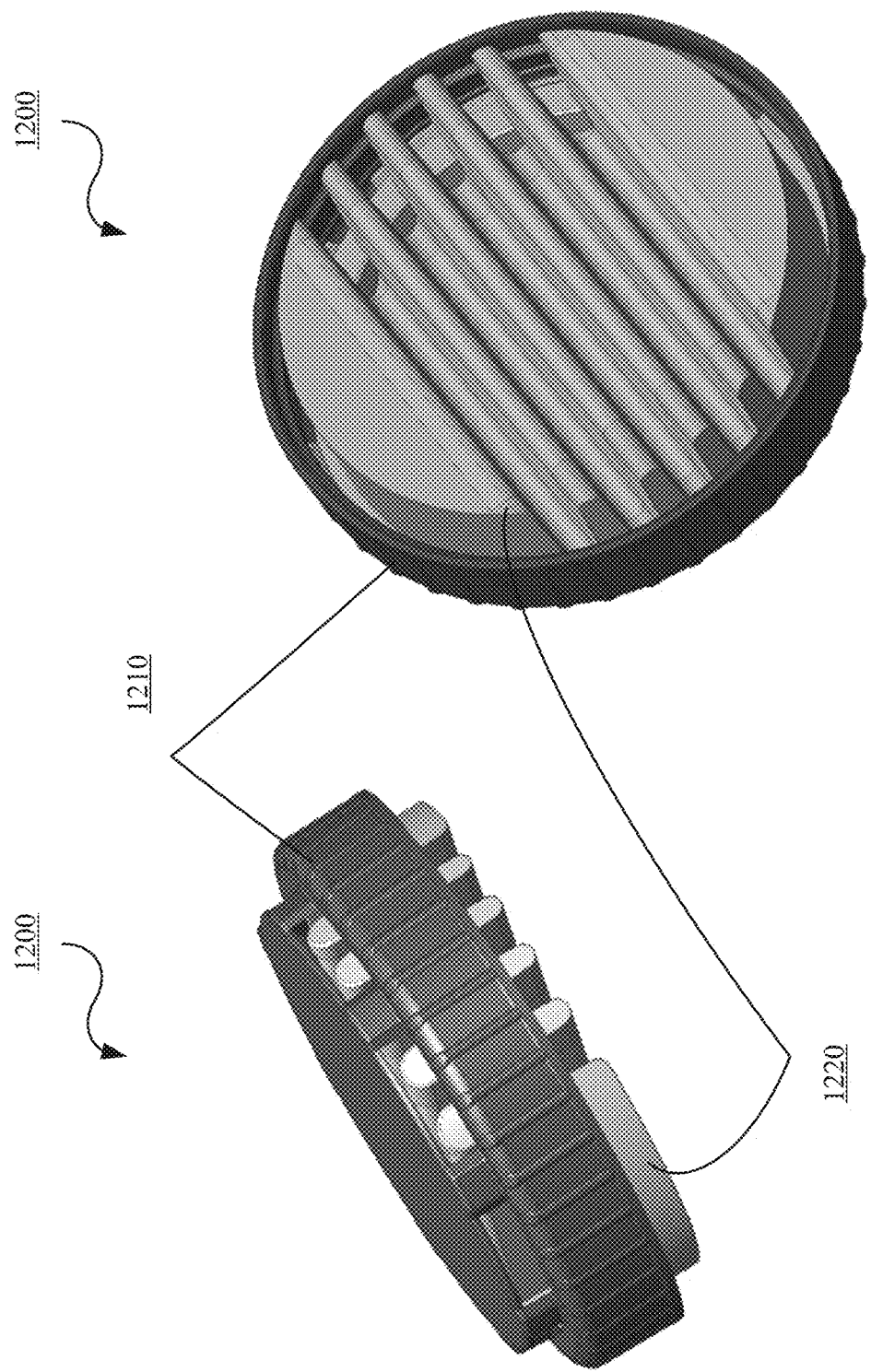
FIG. 5 is a perspective view of a replaceable filter cartridge component in accordance with implementations.
FIG. 6 is a reverse perspective view of the replaceable filter cartridge component of FIG. 5 in accordance with implementations.

FIG. 5 is a perspective view of the replaceable and/or removeable filter cartridge component 1200 in accordance with implementations, FIG. 6 is a reverse perspective view of the replaceable and/or removeable filter cartridge component 1200 of FIG. 5 in accordance with implementations, FIG. 7 is an exploded view of replaceable and/or removeable filter cartridge component 1200 in accordance with implementations, and FIG. 8 is a reverse exploded view of the replaceable and/or removeable filter cartridge component 1200 of FIG. 7 in accordance with implementations. The replaceable and/or removeable filter cartridge component 1200 includes the closure component 1210 and the filter component 1220. The filter component 1220 is fitted into the closure component 1210. The closure component 1210 includes a thread structure 1212 ending at a lip or shelf 1214. The filter component 1220 includes protrusions 1222 which mate and fit within the thread structure 1212 and the lip or shelf 1214. In implementations, the filter component 1220 is snap fit into the closure component 1210. In implementations, the filter component 1220 is friction fit into the closure component 1210.

Figure 10:
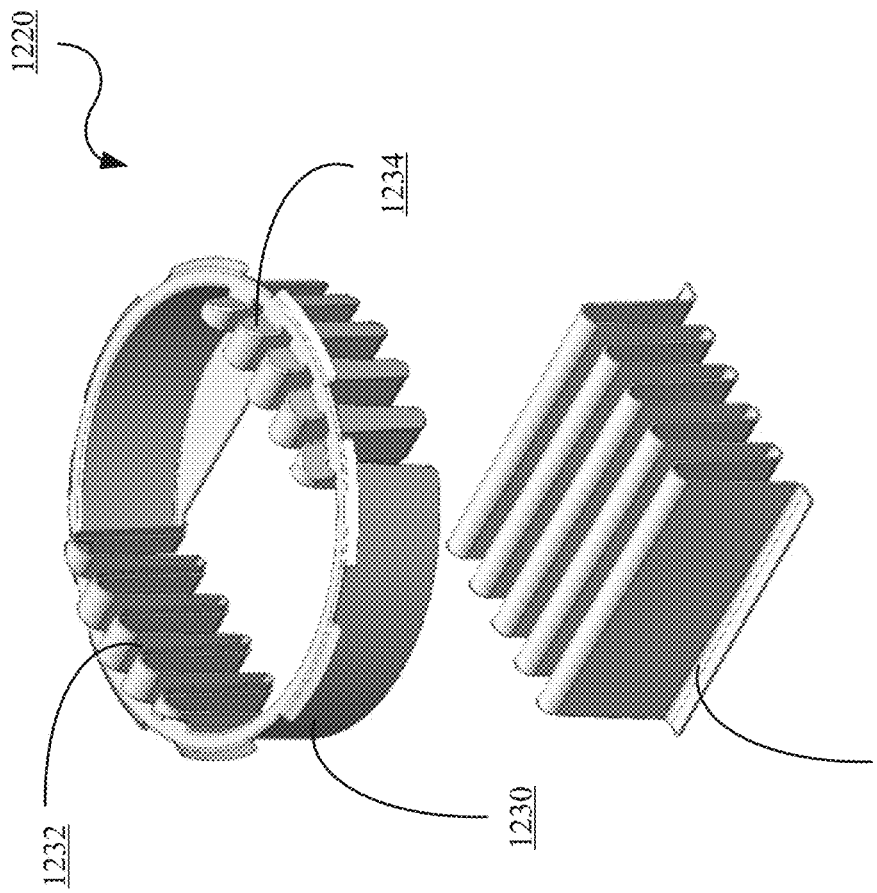
FIG. 10 is an exploded view of the filter component of FIG. 9 in accordance with implementations.
Figure 9:
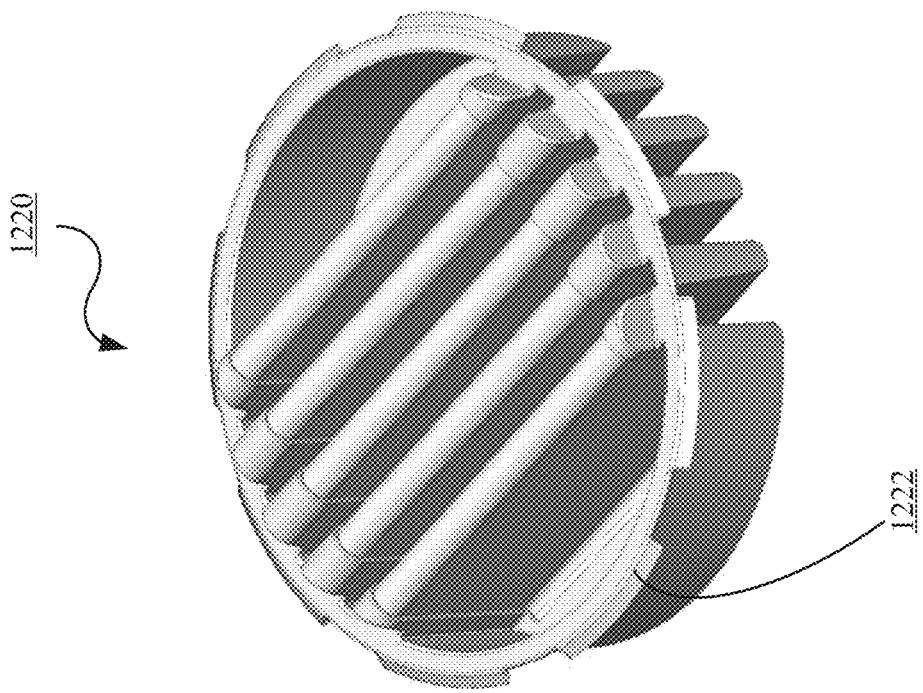
FIG. 9 is a view of a filter component in accordance with implementations.

FIG. 9 is a view of a filter component 1220 in accordance with implementations, FIG. 10 is an exploded view of the filter component of FIG. 9 in accordance with implementations, and FIGS. 11A-F are different views of a filter component in accordance with implementations. The filter component 1220 includes a filter frame component 1230 and a filter material component 1240. The filter frame component 1230 includes a pair of serpentine or multi-folded structures 1232 and 1234. The filter material component 1240 has a serpentine or multi-folded configuration. The filter material component 1240 is molded onto the pair of serpentine or multi-folded structures 1232 and 1234. The pair of serpentine or multi-folded structures 1232 and 1234 and the serpentine or multi-folded configuration of the filter material component 1240 provide increased surface area for filtering with the filter component 1220. In implementations, in-mold labeling is used to bond the filter material component 1240 with the filter frame component 1230. FIG. 11A is a perspective view of the filter component 1220. FIG. 11B is a bottom view of the filter component 1220. FIG. 11C is a side view of the filter component 1220. FIG. 11D is another side view of the filter component 1220. FIG. 11E is a top view of the filter component 1220. FIG. 11F is the filter material component 1240 prior to formation of the serpentine or multi-folded configuration.

Figure 12:
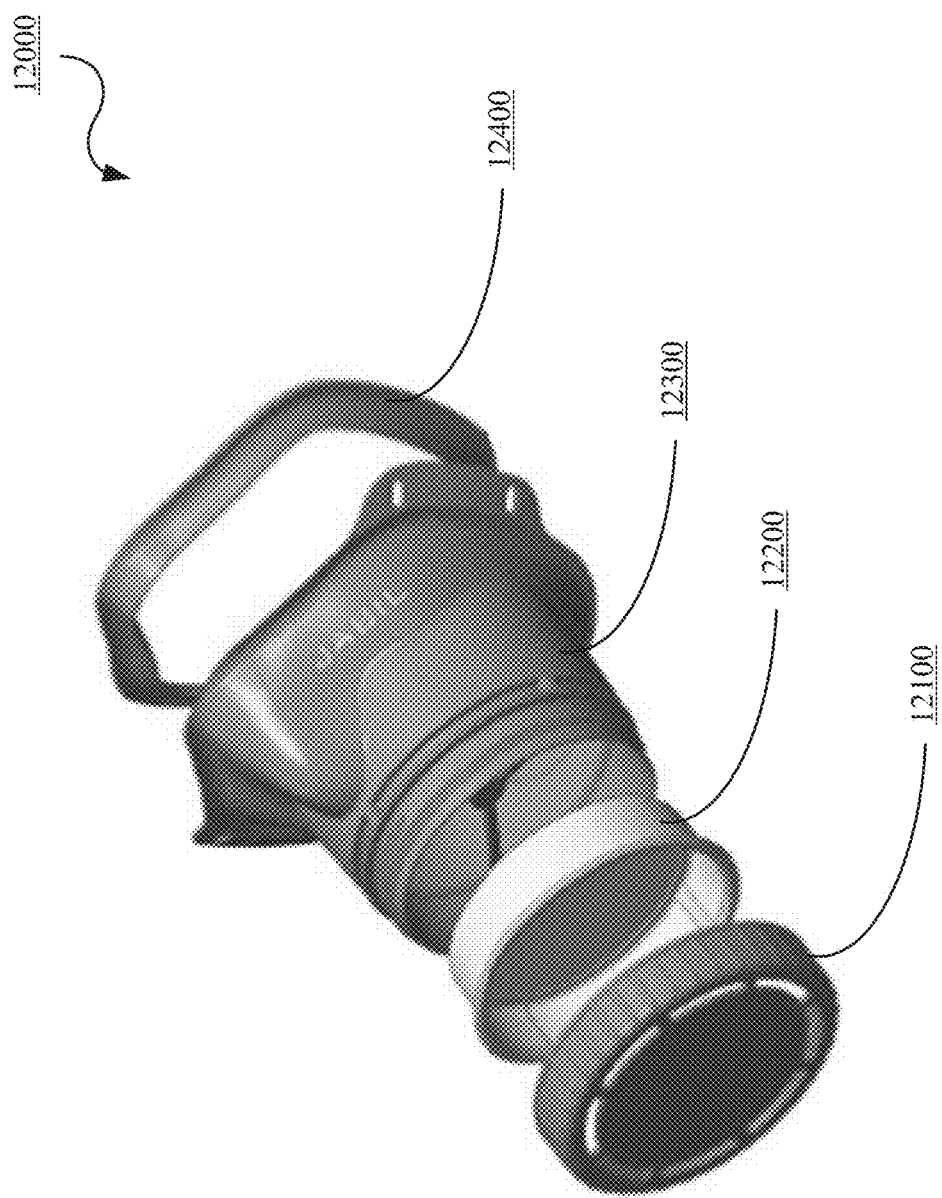
FIG. 12 is an exploded view of a face mask with a replaceable filter cartridge in accordance with implementations.

FIG. 12 is an exploded view of a face mask 12000 with a replaceable filter cartridge in accordance with implementations. The face mask 12000 has a closure component 12100, a filter cartridge or filter component 12200, a mask component 12300, and a gasket-type sealing component 12400. The filter cartridge or filter component 12200 fits into the closure component 12100, which in turn is screwed or interference fitted onto the mask component 12300 resulting in the filter cartridge or filter component 12200 bonding to the closure component 12100. The closure component 12100 is configured to receive the filter component 12200. The gasket-type sealing component 12400 is bonded to the mask component 12300.

FIG. 13A is a perspective view of the filter cartridge or filter component 12200 in accordance with implementations and FIG. 13B is an exploded view of the filter cartridge or filter component 12200 in accordance with implementations. The filter cartridge or filter component 12200 includes a frame component 12210, a filter sidewall component 12220, and a base component 12230. The filter sidewall component 12220 and the base component 12230 are bonded to the frame component 12210 using in-mold labeling.

FIG. 14A is a perspective view of the closure component 12100 engaged with the filter cartridge or filter component 12200 in accordance with implementations and FIG. 14B is a view of a juncture between the closure component 12100 and the filter cartridge component 12020 in accordance with implementations. A lip 12400 of the frame component 12210 snap fits or press fits into the closure component 12100 to form a bond between the closure component 12100 and the filter cartridge or filter component 12200.

FIG. 15A is a view of a closure component 15000 in accordance with implementations, FIG. 15B is a view of a filter frame component 15100 in accordance with implementations, and FIG. 15C is a view of a filter material component 15200 in accordance with implementations. The closure component 15000 has threads for screwing onto or interference fitting with a mask component and enabling a bond between the closure component 15000 and the filter frame component 15100. The closure component 15000 is configured to receive the filter frame component 15100. The filter frame component 15100 includes vertical ribs which enable placement of a filter material component with greater surface area. The filter material component 15200 can be configured and bonded in a serpentine manner on the filter frame component 15100 as shown in FIG. 16, which is a view of a filter cartridge 16000. In implementations, the filter material component 15200 can be bonded to the filter frame component 15100 via in-mold labeling. The filter cartridge 16000 can be interference fit with the closure component 15000 as shown in FIG. 17, which is a view of an assembled closure component with filter cartridge component 17000. The filter cartridge 16000 can be snap-fit or press-fit to bond with the closure component 15000. FIG. 18 is an exploded view of a filter cartridge and/or filter frame component and closure component juncture 18000 in accordance with implementations which shows the interference fit and bond.

FIG. 19 is view of a closure component 19000 in accordance with implementations, FIG. 20 is a view of a filter frame component 20000 in accordance with implementations, FIG. 21 is a view of a filter material sidewall component 21000 in accordance with implementations, and FIG. 22 is a view of a filter material base component 22000 in accordance with implementations. The closure component 19000 has threads for screwing onto or interference fitting with a mask component and enabling a bond between the closure component 19000 and the filter frame component 20000. The closure component 19000 is configured to receive the filter frame component 20000. The filter frame component 20000 is a skeletal frame on which the filter material sidewall component 21000 and the filter material base component 22000 can be bonded as shown in FIG. 23A, which is a view of a filter cartridge 23000. In implementations, the filter material sidewall component 21000 and the filter material base component 22000 can be bonded to the filter frame component 20000 via in-mold labeling. The filter cartridge 23000 can be interference fit with the closure component 19000 as shown in FIG. 23B, which is a view of an assembled closure component with filter cartridge component 23100. The filter cartridge 23000 can be snap-fit or press-fit to bond with the closure component 19000. FIG. 23C is an exploded view of a filter cartridge and/or filter frame component and closure component juncture 23200 in accordance with implementations which shows the interference fit and bond.

Figure 23D:
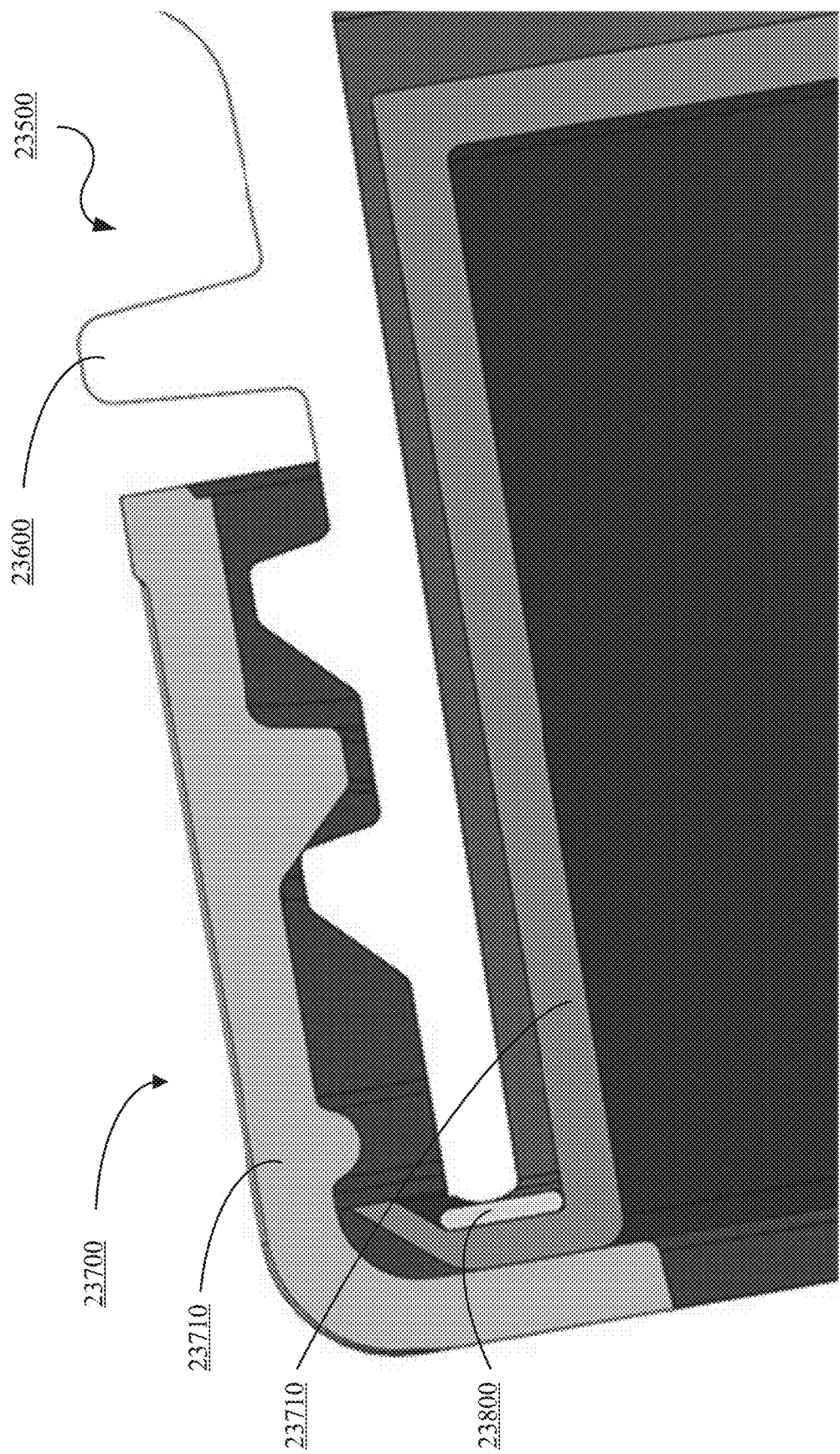
FIG. 23D is an exploded cross-sectional view of a face mask in accordance with implementations.

FIG. 23D is an exploded cross-sectional view of a face mask 23500 in accordance with implementations. The face mask 23500 had a face mask component 23600, a replaceable and/or removeable filter cartridge component 23700, and a resilient seal interface 23800. The replaceable and/or removeable filter cartridge component 23700 can include a closure component 23710 and a filter component 23720. The replaceable and/or removeable filter cartridge component 23700 may be implemented as described herein. In implementations, the resilient seal interface 23800 can be a separate element such as an o-ring or gasket. In implementations, the resilient seal interface 23800 can be integrated with or be a part of the face mask component 23600. In implementations, the resilient seal interface 23800 can be integrated with or be a part of the replaceable and/or removeable filter cartridge component 23700. In implementations, integrated refers to molding of a resilient material with the face mask component 23600 or the replaceable and/or removeable filter cartridge component 23700.

Operationally, when the face mask component 23600 is screwed onto, fit onto, or attached to the replaceable and/or removeable filter cartridge component 23700, the resilient seal interface 23800 is compressed to substantially seal an interface between the face mask component 23600 and the replaceable and/or removeable filter cartridge component 23700 with respect to fluid exchange. In addition, when the face mask component 23600 is screwed onto, fit onto, or attached to the replaceable and/or removeable filter cartridge component 23700, the filter component 23720 is compressed to establish a bond to the closure component 23710 as described herein.

FIG. 24 is a view of a closure component 24000 in accordance with implementations and FIG. 25 is a view of a pleated filter 25000 in accordance with implementations. The closure component 24000 has threads for screwing onto or interference fitting with a mask component and enabling a bond 26000 between the closure component 24000 and the pleated filter 25000 as shown in FIG. 26, which is an enlarged view of the closure component 24000 in an assembled filter configuration 27000. The closure component 24000 is configured to receive the pleated filter 25000.

Figure 30:
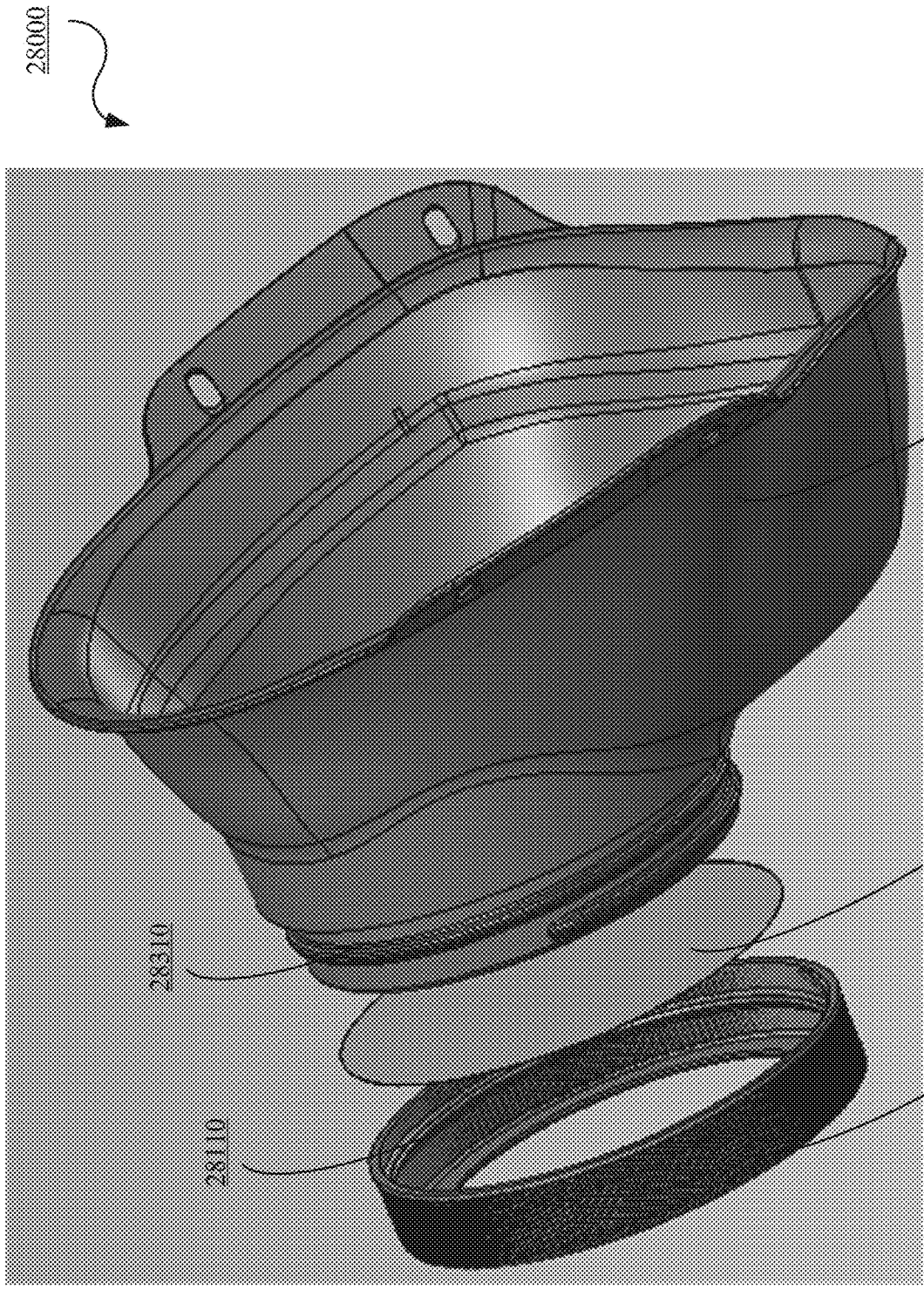
FIG. 30 is an exploded view of the face mask of FIG. 28 in accordance with implementations.

FIG. 28 is a view of a face mask 28000 with a replaceable filter component in accordance with FIG. 26, FIG. 29 is a reverse view of the face mask of FIG. 28, and FIG. 30 is an exploded view of the face mask in accordance with FIGS. 26 and 28. The face mask 28000 can include a closure component 28100, a filter component 28200, and a mask component 28300. The closure component 28100 has threads 28110 for screwing onto or interference fitting with counterpart threads 28310 on the mask component 28300 to bond the filter component 28200 to and as between the closure component 28100 and the mask component 28300. The closure component 28100 is configured to receive the filter component 28200.

Figure 31:
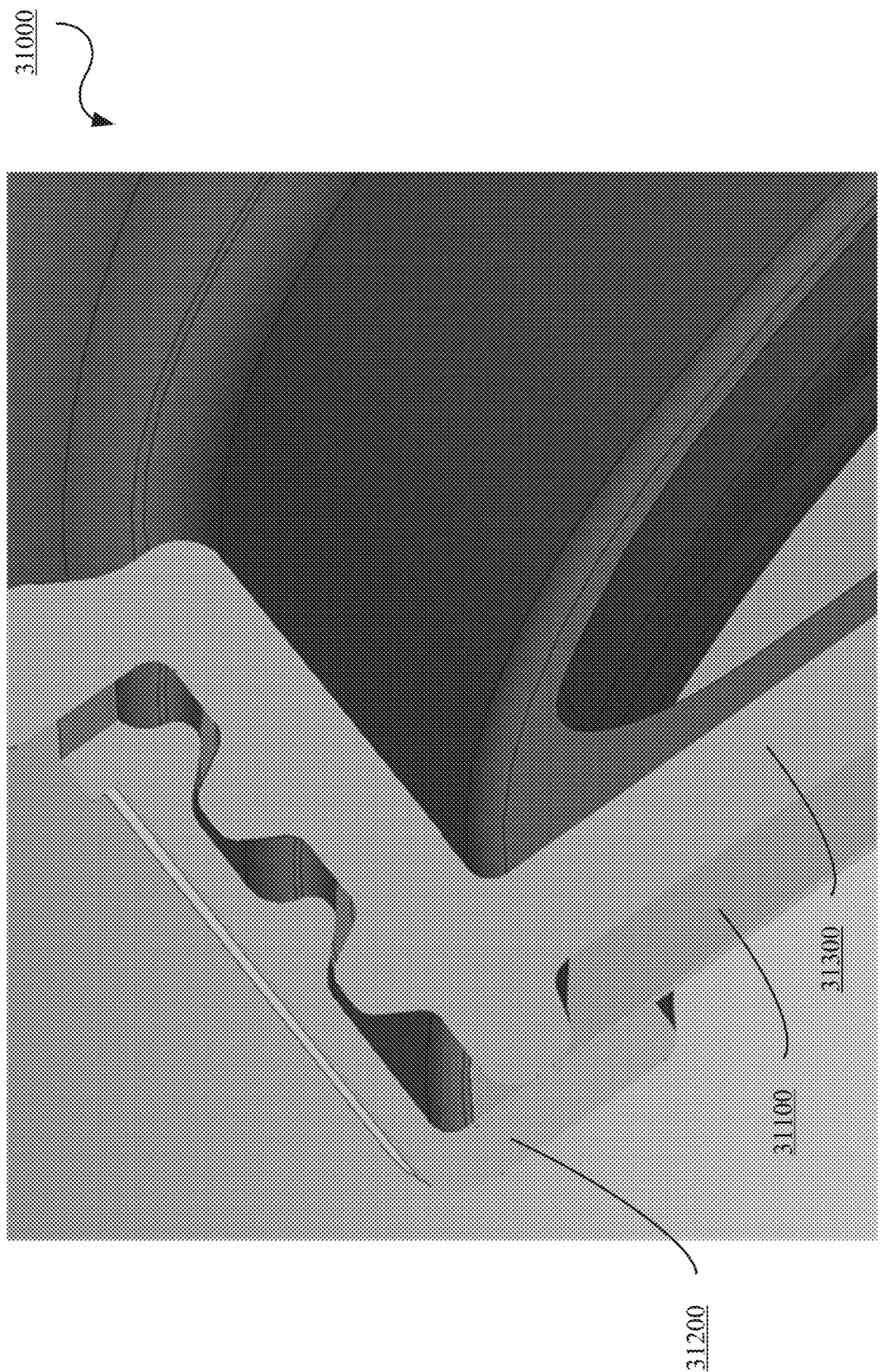
FIG. 31 is an enlarged cross-sectional view of the face mask of FIG. 28 in accordance with implementations.
Figure 32:
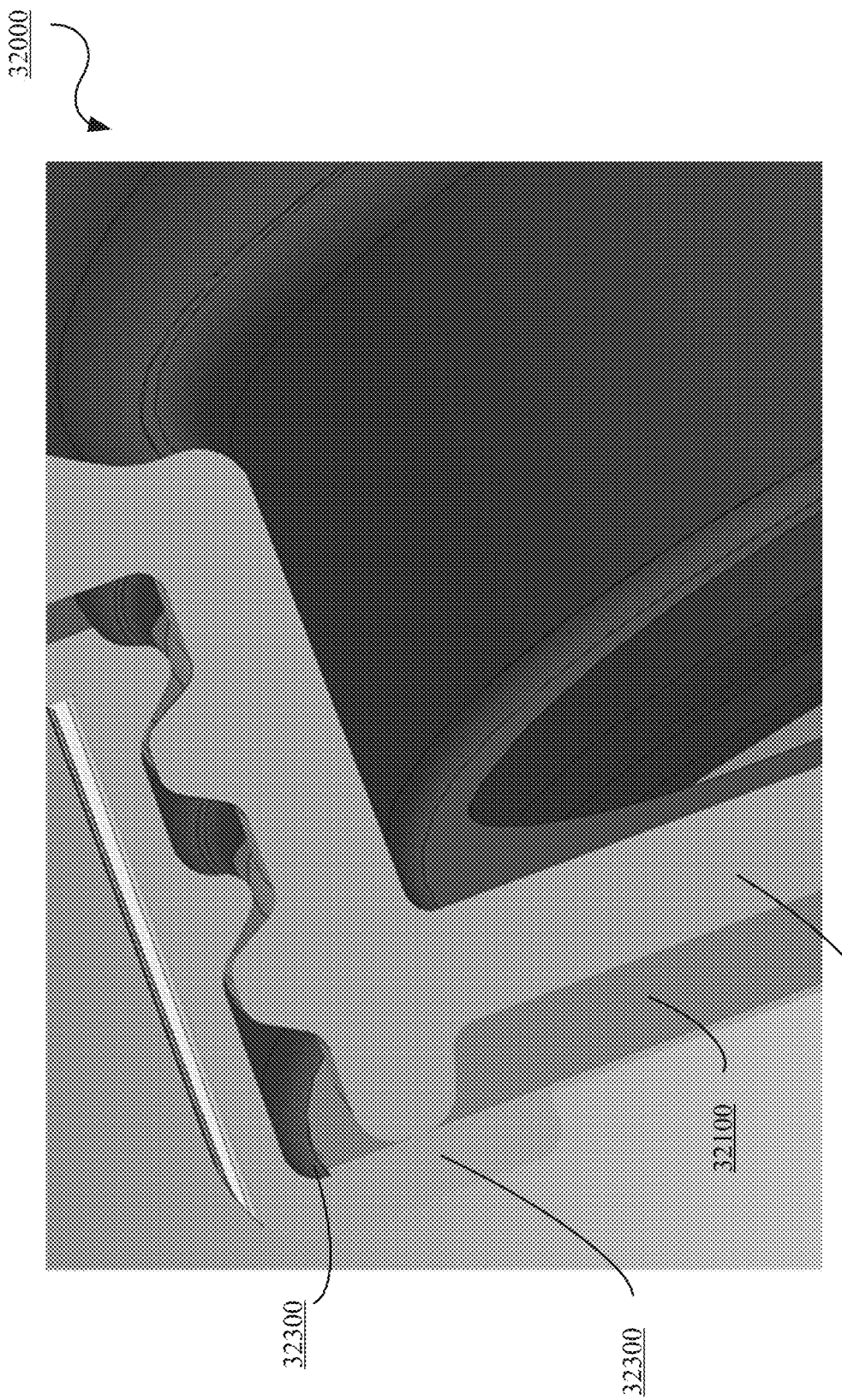
FIG. 32 is another enlarged cross-sectional view of the face mask of FIG. 28 in accordance with implementations.

Examples of the bonding are shown in FIG. 26 as described herein and also shown in FIG. 31, which shows an enlarged cross-sectional view of a face mask 31000 in accordance with FIG. 26 and implementations, and in FIG. 32, which shows another enlarged cross-sectional view of a face mask 32000 in accordance with implementations. In FIG. 31, a filter component 31100 is bonded flush with a closure component 31200 when the closure component 31200 is screwed onto or interference with a mask component 31300. The closure component 31200 is configured to receive the filter component 31100. In FIG. 32, a filter component 32100 is offset from a surface 32200 of a closure component 32300 when the closure component 32300 is screwed or interference fitted onto a mask component 32400. The closure component 32300 is configured to receive the filter component 32100. As evident, the filter component 28200, the filter component 31100, and the filter component 32100 can be replaced after unscrewing or detaching a respective closure component 28100, 31200, and 32300 from a respective mask component 28300, 31300, and 32400.

Operationally with respect to FIGS. 26-32, when the face mask component is screwed onto, interference fit onto, or attached to the closure component, the filter is compressed, via axial force, to establish a bond between the closure and the filter such that the compressed filter at the interface filters any potential air flow in addition to normal filtering by the filter.

Figure 33:
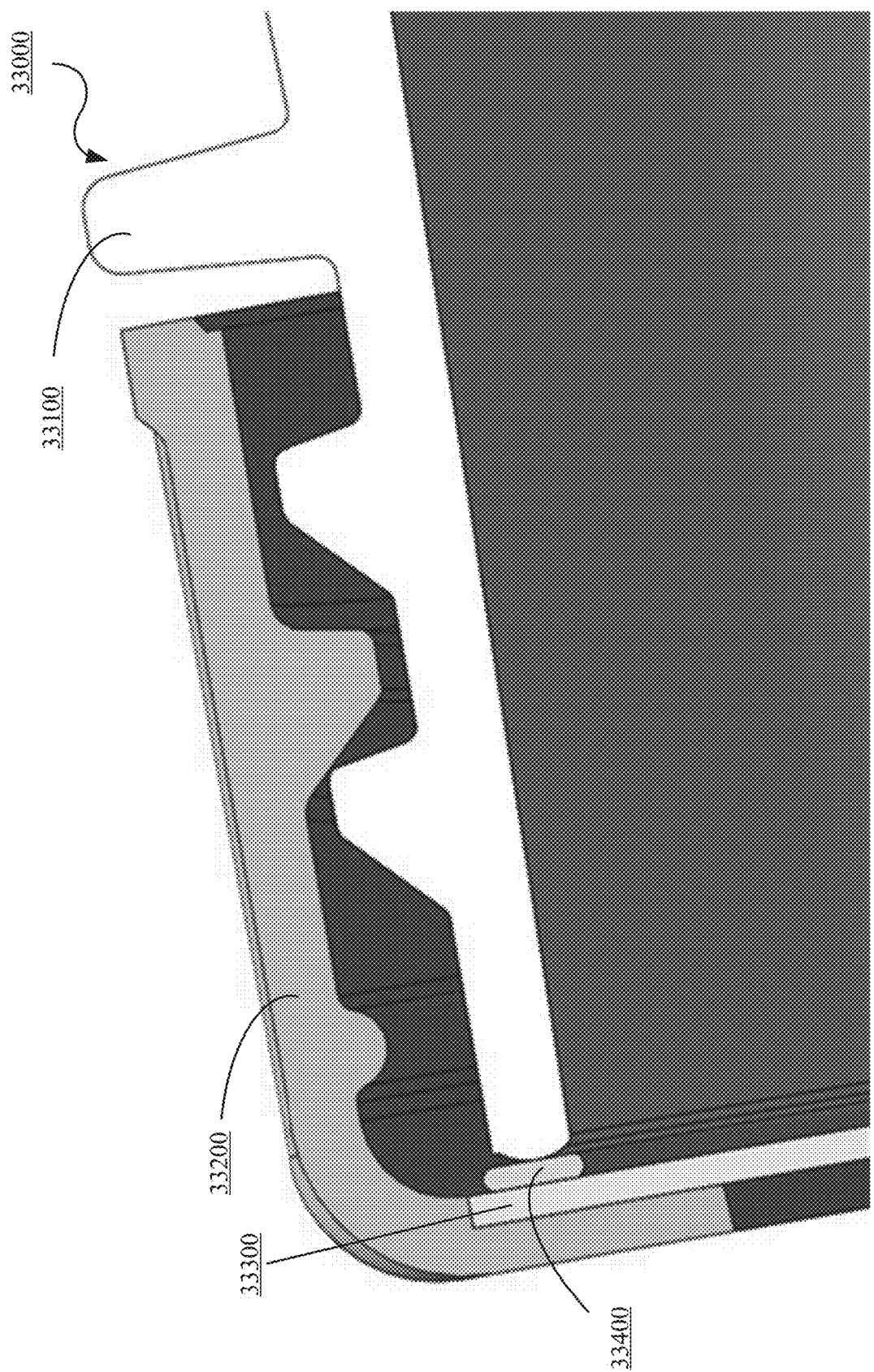
FIG. 33 is an enlarged cross-sectional view of a face mask in accordance with implementations.

FIG. 33 is an enlarged cross-sectional view of a face mask 33000 in accordance with implementations. The face mask 33000 had a face mask component 33100, a replaceable and/or removeable closure 33200, a replaceable and/or removeable filter 33300, and a resilient seal interface 33400. The face mask component 33100, a replaceable and/or removeable closure 33200, a replaceable and/or removeable filter 33300 may be implemented as described herein. In implementations, the resilient seal interface 33400 can be a separate element such as an o-ring or gasket. In implementations, the resilient seal interface 33400 can be integrated with or be a part of the face mask component 33100. In implementations, the resilient seal interface 33400 can be integrated with or be a part of the replaceable and/or removeable filter 33300. In implementations, the resilient seal interface 33400 can be integrated with or be a part of the replaceable and/or removeable closure 33200. In implementations, integrated refers to molding of a resilient material with the face mask component 23600, the replaceable and/or removeable closure 33200 or the replaceable and/or removeable filter 33300.

Operationally, when the face mask component 33100 is screwed onto, fit onto, or attached to the replaceable and/or removeable closure 33200, the resilient seal interface 33400 is compressed to substantially seal an interface between the face mask component 33100 and the replaceable and/or removeable filter 33300 with respect to fluid exchange. In addition, when the face mask component 33100 is screwed onto, fit onto, or attached to the replaceable and/or removeable closure 33200, the replaceable and/or removeable filter 33300 is compressed to establish a bond to the replaceable and/or removeable closure 33200 as described herein.

The face masks with replaceable filter cartridges and components described herein may be manufactured using compression molding, injection molding, in-mold labeling, and other like production processes. The face masks with replaceable filter cartridges and components may be made from biodegradable materials, recyclable materials, sustainable materials, and the like.

The construction and arrangement of the methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials and components, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A face mask comprising:
   a replaceable filter component including one or more vertical rib structures and a filter bonded along each of the one or more vertical rib structures in a serpentine formation via a molding process;
   a closure component configured to receive the replaceable filter component for attachment with a mask component; and
   a resilient seal interface, wherein the replaceable filter component is bonded to and in between the closure component, the resilient seal interface, and the mask component when the closure component is attached to the mask component, wherein the replaceable filter component is bonded to the resilient seal interface, the closure component, and the mask component in between the closure component on one side and the resilient seal interface and mask component on an opposite side.

2. The face mask of claim 1, wherein the replaceable filter component is a multi-folded filter.

3. The face mask of claim 1, wherein the closure component is screwed onto the mask component.

4. The face mask of claim 1, wherein the closure component is interference fit onto the mask component.

5. The face mask of claim 1, wherein the closure component is press fit onto the mask component.

6. The face mask of claim 1, wherein the closure component and the mask component comprise mating components.

7. The face mask of claim 1, further comprising a rubber gasket configured to attach to the mask component, the rubber gasket configured to provide a seal against a user surface.

8. A face mask comprising:
a rubber gasket configured to attach to a mask component, the rubber gasket configured to provide a seal against a user surface; and
a replaceable filter cartridge component configured to attach to the mask component, the replaceable filter cartridge component comprising:
a filter frame including vertical ribs;
a filter configured to bond via a molding process to the filter frame in a serpentine shape along the vertical ribs, wherein the filter comprises a sidewall component and a base component, which are in mold labeled bonded to the filter frame during the molding process;
a closure configured for attachment with the mask component and to receive the filter frame; and
a resilient seal interface, wherein the filter frame is bonded to and in between the closure, the resilient seal interface, and the mask component when the closure is attached to the mask component,
wherein the filter frame is bonded to the resilient seal interface, the closure, and the mask component in between the closure on one side and the resilient seal interface and mask component on an opposite side.

9. The face mask of claim 8, wherein the bond adheres the filter in the serpentine shape to the vertical ribs.

10. The face mask of claim 9, wherein the filter is a multi-folded filter.

11. The face mask of claim 8, wherein the replaceable filter cartridge component is screwed onto the mask component.

12. The face mask of claim 8, wherein the replaceable filter cartridge component is interference fit onto the mask component.

13. The face mask of claim 8, wherein the replaceable filter cartridge component is press fit onto the mask component.

14. The face mask of claim 8, wherein the filter frame is attached to the closure.

15. The face mask of claim 14, wherein the filter frame is interference fit onto the closure.

* * * * *